United States Patent
Zheng et al.

(10) Patent No.: US 10,931,771 B2
(45) Date of Patent: Feb. 23, 2021

(54) METHOD AND APPARATUS FOR PUSHING INFORMATION

(71) Applicant: Baidu Online Network Technology (Beijing) Co., Ltd., Beijing (CN)

(72) Inventors: Canxiang Zheng, Beijing (CN); Qiang Li, Beijing (CN); Qing Ye, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 82 days.

(21) Appl. No.: 16/133,470

(22) Filed: Sep. 17, 2018

(65) Prior Publication Data

US 2019/0166214 A1 May 30, 2019

(30) Foreign Application Priority Data

Nov. 28, 2017 (CN) .......................... 201711219112.6

(51) Int. Cl.
*G06F 15/167* (2006.01)
*H04L 29/08* (2006.01)
(Continued)

(52) U.S. Cl.
CPC ........ *H04L 67/26* (2013.01); *G06F 15/17331* (2013.01); *G06F 16/951* (2019.01);
(Continued)

(58) Field of Classification Search
CPC ..... H04L 67/02; H04L 67/26; H04L 67/2842; H04L 67/2857; G06F 15/17331; G06N 7/005
(Continued)

(56) References Cited

U.S. PATENT DOCUMENTS 7,398,273 B2 *   7/2008  Dobberpuhl ............ H04L 41/12
                                                    709/213
9,021,051 B1 *   4/2015  Taller .................. H04L 67/2842
                                                    709/213
(Continued)

FOREIGN PATENT DOCUMENTS

CN        106097000 A        11/2016
CN        106850800 A         6/2017
CN        106911693 A         6/2017

*Primary Examiner* — Bharat Barot
(74) *Attorney, Agent, or Firm* — Knobbe Martens Olson & Bear LLP

(57) ABSTRACT

A method and an apparatus for pushing information are provided. The method includes: acquiring at least two browser cache files, the at least two browser cache files having identical terminal device attribute information and being from a terminal device having a target Internet protocol IP address; determining, based on an identifier set from the terminal device having the target IP address, a number of the terminal device having the target IP address, and the identifier set including at least one of: a device identifier set, an application identifier set, or a browser cache file identifier set; and determining and pushing a probability that the at least two browser cache files are from a same terminal device based on the number of the terminal device having the target IP address and a predetermined probability that one arbitrary terminal devices has the terminal device attribute information.

12 Claims, 6 Drawing Sheets

(51) Int. Cl.
*G06N 7/00* (2006.01)
*G06F 15/173* (2006.01)
*G06F 16/951* (2019.01)

(52) U.S. Cl.
CPC ............ *G06N 7/005* (2013.01); *H04L 67/02* (2013.01); *H04L 67/2842* (2013.01); *H04L 67/2857* (2013.01)

(58) Field of Classification Search
USPC .................................................. 709/213–215
See application file for complete search history.

(56) References Cited

U.S. PATENT DOCUMENTS

| | | | |
|---|---|---|---|
| 9,571,597 B2* | 2/2017 | Xiao | H04L 67/26 |
| 2004/0267702 A1* | 12/2004 | Gallant | G06F 16/9574 |
| 2012/0296989 A1 | 11/2012 | Lee et al. | |
| 2017/0323025 A1* | 11/2017 | Tian | G06F 16/951 |
| 2017/0329856 A1* | 11/2017 | Jiang | H04L 67/26 |
| 2018/0276709 A1* | 9/2018 | Li | G06Q 30/0225 |
| 2020/0236184 A1* | 7/2020 | Tian | H04L 67/26 |

* cited by examiner

METHOD AND APPARATUS FOR PUSHING INFORMATION

CROSS-REFERENCE TO RELATED APPLICATIONS

This application claims priority to Chinese Patent Application No. 201711219112.6, filed on Nov. 28, 2017, titled "Method and Apparatus for Pushing Information," which is hereby incorporated by reference in its entirety.

TECHNICAL FIELD

Embodiments of the present disclosure relate to the field of computer technology, specifically to the field of Internet technology, and more specifically to a method and an apparatus for pushing information.

BACKGROUND

Currently, in many fields, there is a need to identify a user's terminal device to collect behavior data of the user. In the existing technology, cookies are commonly used to identify mobile devices. The cookie, also known as a browser cache file, is a piece of information generated by a web server based on data such as an IP (Internet Protocol) address, a browser, or a login event when the web server is visited for the first time. The cookie serves as the basis for the website server to identify the user within a period of time.

Generally, different browsers generate different cookies, so that when different browsers of the same terminal device access the same website, the terminal device is regarded as two different terminal devices. In addition, cookies are time-sensitive and likely to be removed by users. When a cookie is invalidated or removed, a newly generated cookie is different from the original cookie.

SUMMARY

Embodiments of the present disclosure propose a method and an apparatus for pushing information.

In a first aspect, the embodiments of the present disclosure provide a method for pushing information, including: acquiring at least two browser cache files, the at least two browser cache files having identical terminal device attribute information and being from a terminal device having a target Internet protocol (IP) address; determining, based on an identifier set from the terminal device having the target IP address, a number of the terminal device having the target IP address, and the identifier set including at least one of: a device identifier set, an application identifier set, or a browser cache file identifier set; and determining and pushing a probability that the at least two browser cache files are from a same terminal device based on the number of the terminal device having the target IP address and a probability that one arbitrary terminal device has the terminal device attribute information.

In some embodiments, the method further includes: marking the at least two browser cache files as being from the same terminal device and generating a corresponding tag, in response to the probability that the at least two browser cache files are from the same terminal device being greater than a preset threshold.

In some embodiments, the terminal device attribute information includes a device name and operating system information of the terminal device.

In some embodiments, the probability that one arbitrary terminal device has the terminal device attribute information is predetermined by: determining, based on historically collected terminal device identifiers, a total number of collected terminal devices and a number of terminal devices having the terminal device attribute information in the collected terminal devices; and determining, based on the number of terminal devices having the terminal device attribute information in the collected terminal devices and the total number of the collected terminal devices, the probability that one arbitrary terminal device has the terminal device attribute information.

In some embodiments, the determining, based on an identifier set from the terminal device having the target IP address, a number of the terminal device having the target IP address, includes: acquiring at least one of a device identifier, an application identifier, or a browser cache file identifier from the terminal device having the target IP address within a predetermined time range to determine the identifier set; classifying and de-duplicating identifiers in the identifier set; and determining the number of the terminal device having the target IP address based on the processed identifier set.

In some embodiments, the determining and pushing a probability that the at least two browser cache files are from a same terminal device based on the number of the terminal device having the target IP address and a probability that one arbitrary terminal device has the terminal device attribute information includes: determining, based on the number of the terminal device having the target IP address, a combination of different numbers of terminal devices having the target IP address and having the terminal device attribute information; determining, based on the probability that one arbitrary terminal device has the terminal device attribute information, a probability of each of the numbers of the terminal devices having the terminal device attribute information; and determining and pushing the probability that the at least two browser cache files are from the same terminal device based on the probabilities of the numbers of the terminal devices having the terminal device attribute information.

In a second aspect, the embodiments of the present disclosure provide an apparatus for pushing information, including: an acquisition unit, configured to acquire at least two browser cache files, the at least two browser cache files having identical terminal device attribute information and being from a terminal device having a target Internet protocol IP address; a determination unit, configured to determine, based on an identifier set from the terminal device having the target IP address, a number of the terminal device having the target IP address, and the identifier set including at least one of: a device identifier set, an application identifier set, or a browser cache file identifier set; and a pushing unit, configured to determine and push a probability that the at least two browser cache files are from a same terminal device based on the number of the terminal device having the target IP address and a probability that one arbitrary terminal device has the terminal device attribute information.

In some embodiments, the apparatus further includes: a marking unit, configured to mark the at least two browser cache files as being from the same terminal device and generate a corresponding tag, in response to the probability that the at least two browser cache files are from the same terminal device being greater than a preset threshold.

In some embodiments, the terminal device attribute information includes a device name and operating system information of the terminal device.

In some embodiments, the apparatus further includes: a predetermination unit, configured to predetermine a probability that one arbitrary terminal device has the terminal device attribute information.

In some embodiments, the predetermination unit includes: a number determination module, configured to determine, based on historically collected terminal device identifiers, a total number of collected terminal devices and a number of terminal devices having the terminal device attribute information in the collected terminal devices; and a probability determination module, configured to determine, based on the number of terminal devices having the terminal device attribute information in the collected terminal devices and the total number of the collected terminal devices, the probability that one arbitrary terminal device has the terminal device attribute information.

In some embodiments, the determination unit includes: an acquisition module, configured to acquire at least one of a device identifier, an application identifier, or a browser cache file identifier from the terminal device having the target IP address within a predetermined time range to determine the identifier set; a processing module, configured to classifying and de-duplicating identifiers in the identifier set; and a determination module, configured to determine the number of the terminal device having the target IP address based on the processed identifier set.

In some embodiments, the pushing unit includes: a combination determination module, configured to determine, based on the number of the terminal device having the target IP address, a combination of different numbers of terminal devices having the target IP address and having the terminal device attribute information; a probability determination module, configured to determine, based on the probability that one arbitrary terminal device has the terminal device attribute information, a probability of each of the numbers of the terminal devices having the terminal device attribute information; and a pushing module, configured to determine and push the probability that the at least two browser cache files are from the same terminal device based on the probabilities of the numbers of the terminal devices having the terminal device attribute information.

The method and apparatus for pushing information according to the embodiments of the present disclosure acquire at least two browser cache files having the identical terminal device attribute information and being from a terminal device having a target IP address, determine, based on an identifier set from the terminal device having the target IP address, the number of the terminal device having the target IP address, and then determine and push the probability that the at least two browser cache files are from the same terminal device based on the number of the terminal device having the target IP address and the predetermined probability that one arbitrary terminal device has the terminal device attribute information, thereby improving the accuracy of determining that the at least two browser cache files are from the same terminal device.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present disclosure and the features in the embodiments may be combined with each other on a non-conflict basis. The present disclosure will be described below in detail with reference to the accompanying drawings and in combination with the embodiments.

Figure 1:
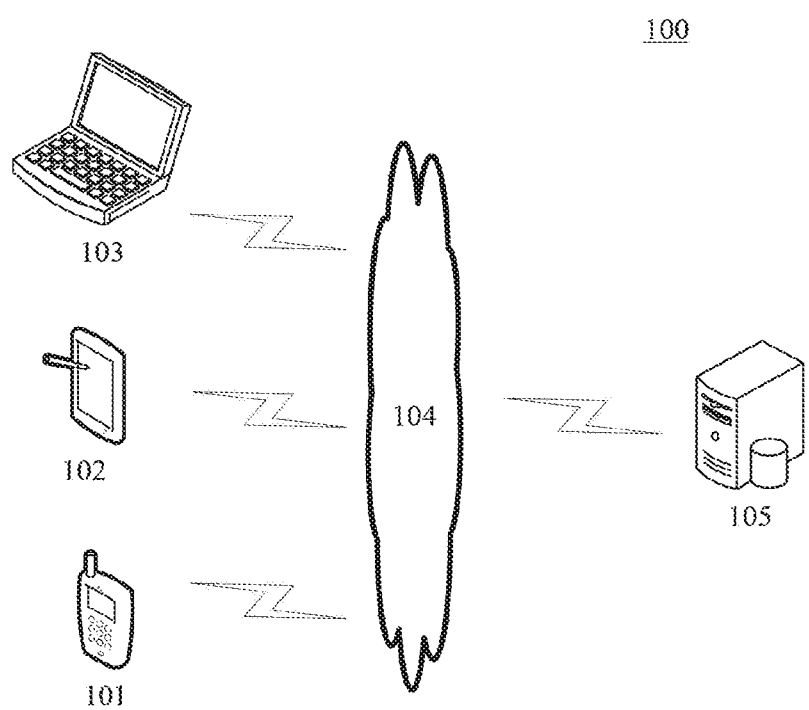
FIG. 1 is a system architecture diagram to which some embodiments of the present disclosure may be applied.

FIG. 1 shows a system architecture 100 in which a method for pushing information or an apparatus for pushing information according to the embodiments of the present disclosure may be implemented.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user 110 may use the terminal devices 101, 102 and 103 to interact with the server 105 through the network 104, in order to transmit or receive messages, etc. Various communication client applications, such as webpage browser applications, shopping applications, search applications, instant messaging tools, mailbox clients, and social platform software may be installed on the terminal devices 101, 102 and 103.

The terminal devices 101, 102 and 103 may be various electronic devices having display screens and supporting webpage browsing, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

The server 105 may be a server providing various services, for example, a backend server providing supports to browsers displaying webpages on the terminal devices 101, 102 and 103. The backend server may perform a processing such as an analysis on data such as received cookies, and push information to the terminal devices 101, 102 and 103 based on the analysis result.

It should be noted that the method for pushing information according to the embodiments of the present disclosure is generally executed by the server 105. Accordingly, the apparatus for pushing information is generally installed on the server 105.

It should be appreciated that the numbers of the terminal devices, the networks and the servers in FIG. 1 are merely illustrative. Any number of terminal devices, networks and servers may be provided based on the actual requirements.

Figure 2:
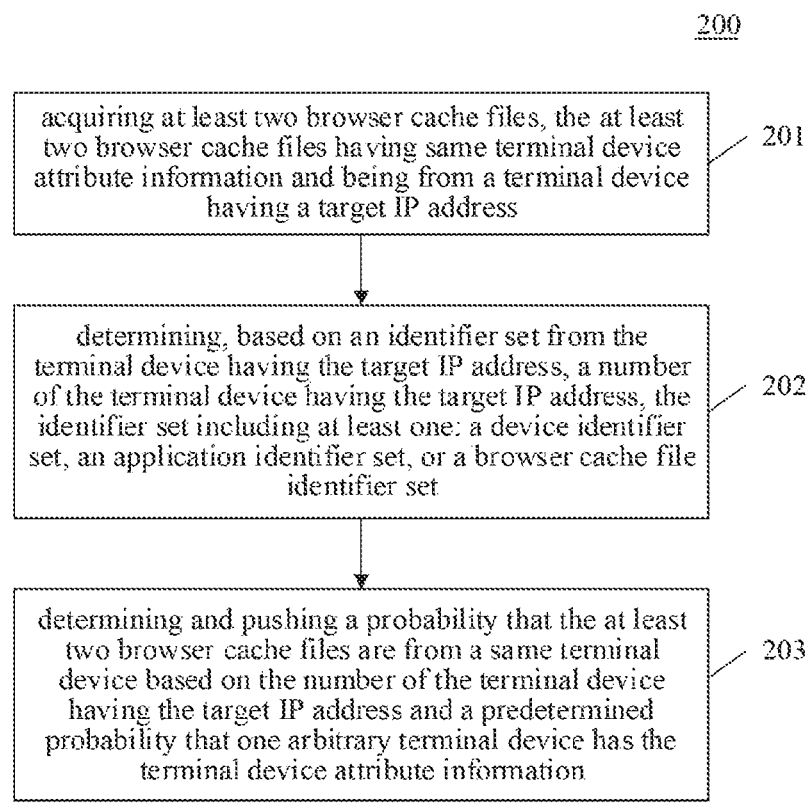
FIG. 2 is a flowchart of an embodiment of a method for pushing information according to the present disclosure.

With further reference to FIG. 2, a flow 200 of an embodiment of the method for pushing information according to the present disclosure is illustrated. The method for pushing information includes steps 201 to 203.

Step 201 includes acquiring at least two browser cache files, the at least two browser cache files having identical terminal device attribute information and being from a terminal device having a target IP address.

In the present embodiment, the electronic device (e.g., the server as shown in FIG. 1) on which the method for pushing information is implemented may acquire the at least two browser cache files (for example, cookie files) through a browser running on the terminal device having the target IP address through a wired connection or a wireless connection. The browser cache file may have the attribute information of the terminal device that transmits the browser cache file, and the at least two browser cache files have the same terminal device attribute.

Here, the browser may be a browser application that provides web browsing (for example, a browser application such as Internet Explorer or Firefox), or other applications having a browser function (for example, a chat application, and a navigation application).

Generally, the browser interacts with the server in HTTP (HyperText Transfer Protocol), that is, the browser cache file may have a terminal device attribute information included in the User_Agent (user agent, part of the HTTP protocol). Since the User_Agent cannot acquire a unique identifier of the terminal device such as IMEI (International Mobile Equipment Identity), it is generally impossible to determine a unique terminal device by the browser cache file.

In some alternative implementations of the present embodiment, the terminal device attribute information includes a device name and operating system information of the terminal device.

It should be understood that the browser cache file may be acquired from the terminal device having the target IP, or may be acquired from a local memory or a remote memory, for example, the browser cache file generated/acquired during the previous interaction through the browser is stored in the local memory or the remote memory in advance. As long as the browser cache files acquired by the server are from the terminal device having the target IP address and have the same terminal device information, the acquisition way is not limited in the present disclosure.

Step 202 includes determining, based on an identifier set from the terminal device having the target IP address, a number of the terminal device having the target IP address, the identifier set including at least one: a device identifier set, an application identifier set, or a browser cache file identifier set.

In the present embodiment, the electronic device (e.g., the server as shown in FIG. 1) on which the method for pushing information is implemented may acquire the identifier set from the terminal device having the target IP address through a wired connection or a wireless connection, and determine the number of the terminal device having the target IP address based on the acquired identifier set. Here, the identifier set may include at least one of: a device identifier (for example, IMEI) set, an application identifier (identifier of the application installed on the terminal device) set, or a browser cache file identifier set.

It should be noted that the identifier set (for example, the browser cache file identifier set) may be acquired by a browser on the terminal device having the target IP address, and the identifier set (for example, at least one of the device identifier set or the application identifier set) may alternatively be acquired by other applications (for example, a chat application, a navigation application, and the like) that run on the terminal device having the target IP address, which is not limited in the present disclosure. Those skilled in the art may determine the acquisition way according to the needs of the actual application scenario.

Step 203 includes determining and pushing a probability that the at least two browser cache files are from a same terminal device based on the number of the terminal device having the target IP address and a probability that one arbitrary terminal device has the terminal device attribute information.

In the present embodiment, the server on which the method for pushing information is implemented may predetermine the probability that one arbitrary terminal device has the terminal device attribute information, and then determine, based on the number of the terminal device having the target IP address determined in step 202 and the predetermined probability that one arbitrary terminal device has the terminal device attribute information, the probability that the at least two browser cache files acquired in step 201 are from the same terminal device, and push the probability that the at least two browser cache files are from the same terminal device.

In some alternative implementations of the present embodiment, the probability that one arbitrary terminal device has the terminal device attribute information is predetermined by: determining, based on historically collected terminal device identifiers, a total number of collected terminal devices and a number of terminal devices having the terminal device attribute information in the collected terminal devices; and determining, based on the number of terminal devices having the terminal device attribute information in the collected terminal devices and the total number of the collected terminal devices, the probability that one arbitrary terminal device has the terminal device attribute information.

For example, by analyzing and processing the historically collected terminal device identifiers, the number N of the collected terminal devices and the number $N_0$ of terminal devices having the terminal device attribute information may be determined, so that the probability $P_0$ that one arbitrary terminal device has the terminal device attribute information may be determined as $N_0/N$. Here, N and $N_0$ are natural numbers, $P_0$ is a positive number smaller than 1, and $N > N_0$.

Figure 3:
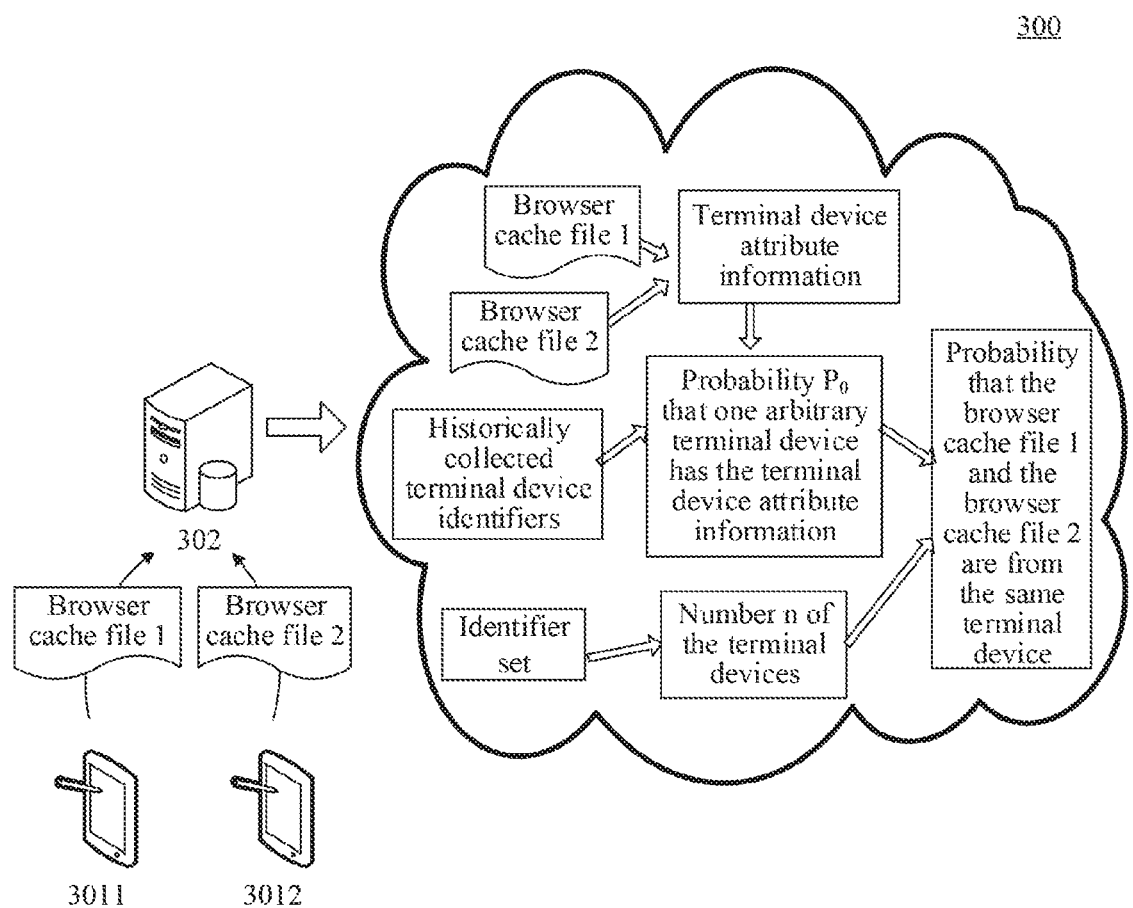
FIG. 3 is a schematic diagram of an application scenario of the method for pushing information according to some embodiments of the present disclosure.

With further reference to FIG. 3, FIG. 3 is a schematic diagram of an application scenario 300 of the method for pushing information according to the present embodiment. In the application scenario 300 shown in FIG. 3, the server 302 acquires the browser cache file 1 and the browser cache file 2 having the identical terminal device attribute information from the terminal devices 3011 and 3012 having the target IP address. After that, the server 302 collects an identifier set of terminal devices having the target IP address, and analyzes and processes the collected identifier set to determine the number n of the terminal devices having the target IP address. Then, the server 302 determines the total number of the collected terminal devices and the number of terminal devices having the terminal device attribute information based on the historically collected terminal device identifiers, thereby determining the probability $P_0$ that one arbitrary terminal device has the terminal device attribute information. Finally, the server 302 determines, based on the determined number n of the terminal devices and the probability $P_0$, the probability P that the browser cache file 1 and the browser cache file 2 are from the same terminal device (i.e., the probability that the terminal devices 3011 and 3012 are the same terminal device), and pushes the probability P.

In the method according to the embodiments of the present disclosure, the probability that at least two browser cache files having the identical terminal device attribute information are from the same terminal device is determined by analyzing and processing historically collected terminal device identifiers and an identifier set of terminal devices having the target IP address. The data such as the terminal device identifiers and the identifier set of the terminal devices is stable and not likely to change, thereby avoiding the affection of the instability of the browser cache file itself on the analysis and processing, and improving the accuracy of determining that the at least two browser cache files are from the same terminal device.

Figure 4:
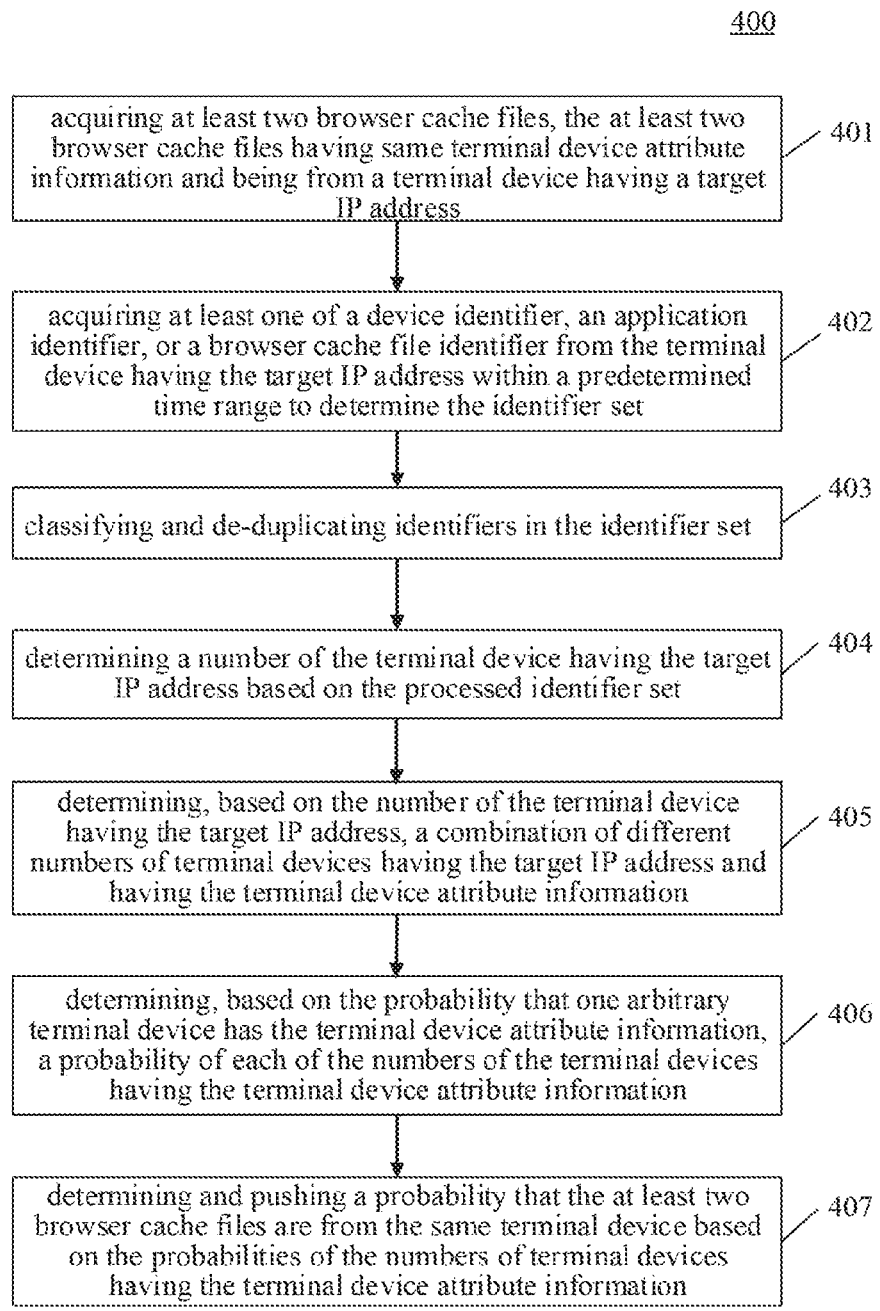
FIG. 4 is a flowchart of another embodiment of the method for pushing information according to the present disclosure.

With further reference to FIG. 4, a flow 400 of another embodiment of the method for pushing information is illustrated. The flow 400 of the method for pushing information includes steps 401 to 407.

Step 401 includes acquiring at least two browser cache files, the at least two browser cache files being from a terminal device having a target IP address, and having identical terminal device attribute information.

In the present embodiment, the electronic device (e.g., the server as shown in FIG. 1) on which the method for pushing information is implemented may acquire at least two browser cache files through a browser running on the terminal device having the target IP address through a wired connection or a wireless connection. The browser cache file may have an attribute of the terminal device that transmits the browser cache file, and the at least two browser cache files have the identical terminal device attribute information.

Step 402 includes acquiring at least one of a device identifier, an application identifier, or a browser cache file identifier from the terminal device having the target IP address within a predetermined time range to determine the identifier set.

In the present embodiment, the server on which the method for pushing information is implemented may continuously acquire at least one of the device identifier, the application identifier, or the browser cache file identifier from the terminal device having the target IP address within the predetermined time range (for example, 30 hours), and determine the identifier set based on the acquired identifiers within the predetermined time range.

Step 403 includes classifying and de-duplicating identifiers in the identifier set.

Since the identifier set acquired in step 402 may have duplicate identifiers (e.g., there may be multiple identifiers acquired from the same terminal device) or false identifiers (e.g., there may be an identifier acquired from the virtual machine of the terminal device), the server needs to classify and de-duplicate the acquired identifier set to obtain the processed identifier set.

Step 404 includes determining a number of the terminal device having the target IP address based on the processed identifier set.

In the present embodiment, the number of the terminal device having the target IP is determined by acquiring the identifier set of the terminal device having the target IP address and performing an analysis on the identifier set, which can acquire a more accurate number of the terminal device compared with directly analyzing and processing the browser cache file. In addition, the identifier set is not limited to being acquired by using HTTP, but may alternatively be acquired by other means, such as through APP (abbreviation of application, mainly refers to application software installed on smart devices such as mobile phones, and tablets), so that the acquired identifier set can reflect the number of terminal device having the target IP more comprehensively.

Step 405 includes determining, based on the number of the terminal device having the target IP address, a combination of different numbers of terminal devices having the target IP address and having the terminal device attribute information.

Step 406 includes determining, based on the probability that one arbitrary terminal device has the terminal device attribute information, a probability of each of the numbers of the terminal devices having the terminal device attribute information.

For example, when the server acquires two browser cache files in step 401, when the number of terminal devices having the target IP address is determined as n in step 404, the combination of the numbers of the terminal devices having the target IP address and having the terminal device attribute information may be determined as: 1, 2, ..., n, and then the probability $P_i$ of each of the numbers of the terminal devices having the terminal device attribute information, such as a probability $P_1$ of one terminal device having the terminal device attribute information, a probability $P_2$ of two terminal devices having the terminal device attribute information, ..., or a probability $P_n$ of n terminal devices having the terminal device attribute information, is determined based on the probability that one arbitrary terminal device having the terminal device attribute information (for example, the probability $P_0$ shown in FIG. 3). Here, the probability $P_i$ may be calculated by the following formula:

$$P_i = C_{n-1}^{i-1} \times (P_0)^{i-1} \times (1-P_0)^{n-i} \qquad (1)$$

Here, $P_i$ is the probability that the i-th terminal device has the terminal device attribute information, $P_0$ is the probability that one arbitrary terminal device has the terminal device attribute information, $C_{n-1}^{i-1}$ is the number of combinations of (i−1) terminal devices in (n−1) terminal devices. Here, n is the number of the terminal devices having the target IP address, i and n are natural numbers, and i<n.

Step 407 includes determining and pushing a probability that the at least two browser cache files are from the same terminal device based on the probabilities of the numbers of terminal devices having the terminal device attribute information.

For example, if the server acquires two browser cache files in step 401, based on the probability $P_i$ of each of the numbers of terminal devices having the terminal device attribute information determined in step 406, the probability P that the two browser cache files are from the same terminal device may be determined by the following formula:

$$P = \sum_{i=1}^{n} \frac{P_i}{i} \qquad (2)$$

Although the above example describes the case of determining the probability that two browser cache files are from the same terminal device, the present embodiment is not limited thereto. It should be understood that when the server acquires more (for example, three, four, etc.) browser cache files, similar processing may be adopted, and detailed description thereof will be omitted.

As can be seen from FIG. 4, the flow 400 of the method for pushing information in the present embodiment highlights the step of determining the number of terminal devices having the target IP address and the step of determining, based on the number of terminal devices having the target IP address and the probability that one arbitrary terminal device has the terminal device attribute information, the probability that the two browser cache files are from the same terminal device, as compared with the embodiment corresponding to FIG. 2. Therefore, the solution described in the present embodiment may determine the probability that the at least two browser cache files are from the same terminal device by determining the probability of each of numbers of terminal devices having the terminal device attribute information, which not only simplifies the processing but also improves the accuracy of determining that the at least two browser cache files are from the same terminal device.

In some alternative implementations of the present embodiment, the method further includes: marking the at least two browser cache files as being from the same terminal device and generating a corresponding tag, in response to the probability that the at least two browser cache files are from the same terminal device being greater than a preset threshold (e.g., 70%, 90%, etc.), thereby facilitating analyzing and processing user behavior data when needed.

Figure 5:
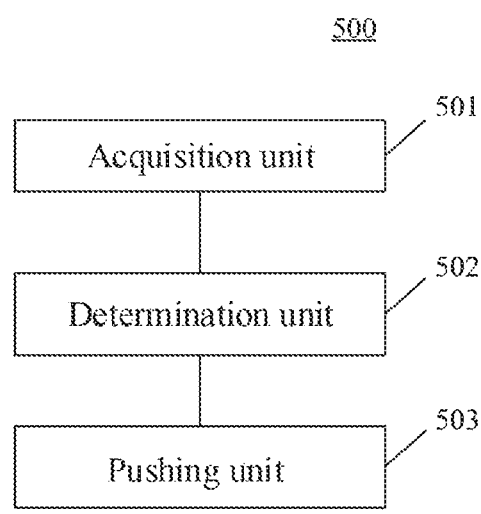
FIG. 5 is a schematic structural diagram of an embodiment of an apparatus for pushing information according to the present disclosure.

With further reference to FIG. 5, as an implementation to the method shown in the above figures, the present disclosure provides an embodiment of an apparatus for pushing information. The apparatus embodiment corresponds to the method embodiment shown in FIG. 2, and the apparatus may specifically be applied to the server.

As shown in FIG. 5, the apparatus 500 for pushing information of the present embodiment includes: an acquisition unit 501, a determination unit 502 and a pushing unit 503. The acquisition unit 501 is configured to acquire at least two browser cache files, the at least two browser cache files having identical terminal device attribute information and being from a terminal device having a target Internet protocol IP address. The determination unit 502 is configured to determine, based on an identifier set from the terminal device having the target IP address, a number of the terminal device having the target IP address, and the identifier set including at least one of: a device identifier set, an application identifier set, or a browser cache file identifier set. The pushing unit 503 is configured to determine and push a probability that the at least two browser cache files are from a same terminal device based on the number of the terminal device having the target IP address and a predetermined probability that one arbitrary terminal device has the terminal device attribute information.

In the present embodiment, the acquisition unit 501 of the apparatus 500 for pushing information may acquire at least two browser cache files (for example, a cookie file) through a browser running on the terminal device having the target IP address through a wired connection or a wireless connection. The browser cache file may have attribute information of the terminal device that transmits the browser cache file, and the at least two browser cache files have the identical terminal device attribute information.

In the present embodiment, the determination unit 502 may acquire an identifier set from the terminal device having the target IP address through a wired connection or a wireless connection, and determine the number of the terminal device having the target IP address based on the acquired identifier set.

Then, the pushing unit 503 may predetermine the probability that one arbitrary terminal device has the terminal device attribute information, and then determine, based on the number of terminal device having the target IP address determined by the determination unit 502 and the probability that one arbitrary terminal device has the terminal device attribute information, the probability that at least two browser cache files acquired by the acquisition unit 501 are from the same terminal device and push the probability that the at least two browser cache files are from the same terminal device.

In some alternative implementations of the present embodiment, the apparatus 500 further includes a marking unit. Here, the marking unit is configured to mark the at least two browser cache files as being from the same terminal device and generate a corresponding tag, in response to the probability that the at least two browser cache files are from the same terminal device being greater than a preset threshold, thereby facilitating analyzing and processing user behavior data when needed.

In some alternative implementations of the present embodiment, the terminal device attribute information includes a device name and operating system information of the terminal device.

In some alternative implementations of the present embodiment, the apparatus 500 further includes a predetermination unit. Here, the predetermination unit is configured to predetermine a probability that one arbitrary terminal device has the terminal device attribute information.

In some alternative implementations of the present embodiment, the predetermination unit includes a number determination module and a probability determination module. Here, the number determination module is configured to determine, based on historically collected terminal device identifiers, a total number of collected terminal devices and a number of terminal devices having the terminal device attribute information in the collected terminal devices. The probability determination module is configured to determine, based on the number of terminal devices having the terminal device attribute information in the collected terminal devices and the total number of the collected terminal devices, the probability that one arbitrary terminal device has the terminal device attribute information.

In some alternative implementations of the present embodiment, the determination unit 502 includes an acquisition module, a processing module and a determination module. Here, the acquisition module is configured to acquire at least one of a device identifier, an application identifier, or a browser cache file identifier from the terminal device having the target IP address within a predetermined time range to determine the identifier set. The processing module is configured to classifying and de-duplicating identifiers in the identifier set. The determination module is configured to determine the number of the terminal device having the target IP address based on the processed identifier set.

In some alternative implementations of the present embodiment, the pushing unit includes a combination determination module, a probability determination module and a pushing module. Here, the combination determination module is configured to determine, based on the number of the terminal device having the target IP address, a combination of different numbers of terminal devices having the target IP address and having the terminal device attribute information. The probability determination module is configured to determine, based on the probability that one arbitrary terminal device has the terminal device attribute information, a probability of each of the numbers of terminal devices having the terminal device attribute information. The pushing module is configured to determine and push the probability that the at least two browser cache files are from the same terminal device based on the probabilities of the numbers of the terminal devices having the terminal device attribute information.

The apparatus 500 for pushing information according to the embodiments of the present disclosure determines the probability that at least two browser cache files having the identical terminal device attribute information are from the same terminal device by analyzing and processing historically collected terminal device identifiers and an identifier set of terminal devices having the target IP address. The data such as the terminal device identifiers and the identifier set of the terminal devices is stable and not likely to change, thereby avoiding the affection of the instability of the browser cache file itself on the analysis and processing, and improving the accuracy of determining that the at least two browser cache files are from the same terminal device.

Figure 6:
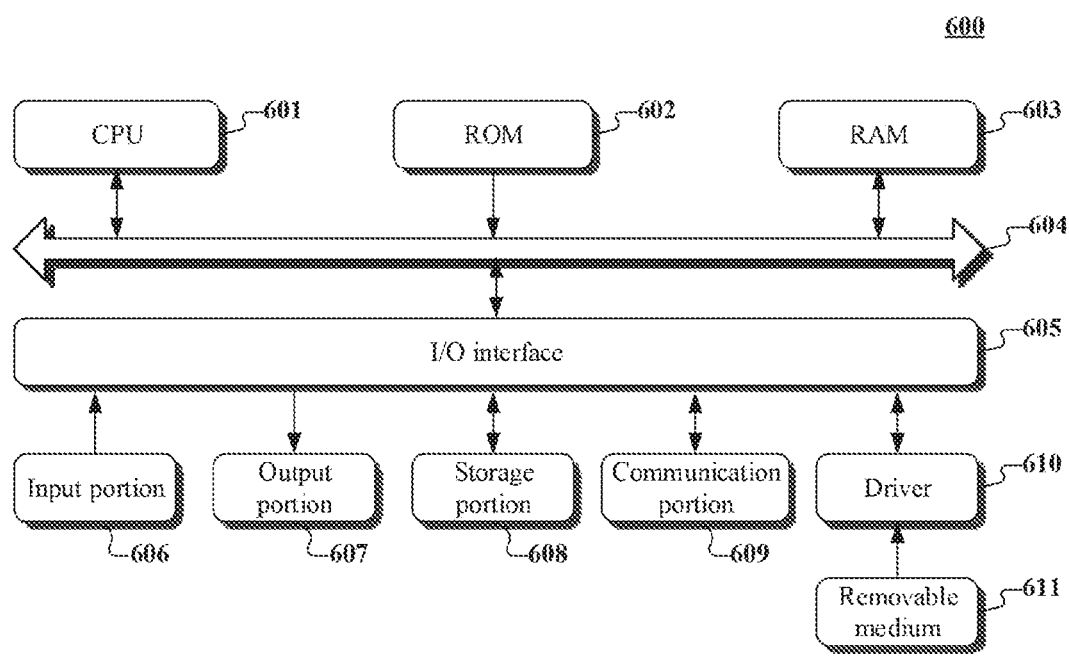
FIG. 6 is a schematic structural diagram of a computer system adapted to implement a server of the embodiments of the present disclosure.

Referring to FIG. 6, a schematic structural diagram of a computer system 600 adapted to implement a server of the embodiments of the present disclosure is shown. The electronic device shown in FIG. 6 is only an example, and should not limit a function and scope of the embodiment of the disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 including a cathode ray tube (CRT), a liquid crystal display device (LCD), a speaker etc.; a storage portion 608 including a hard disk and the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion X08 as needed.

In particular, according to embodiments of the present disclosure, the process described above with reference to the flow chart may be implemented in a computer software program. For example, an embodiment of the present disclosure includes a computer program product, which includes a computer program that is embedded in a computer-readable medium. The computer program includes program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

A computer program code for executing operations in the disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, including an acquisition unit, a determination unit and a pushing unit, where the names of these units do not in some cases constitute a limitation to such units themselves. For example, the acquisition unit may also be described as "a unit for acquiring at least browser cache files."

In another aspect, the present disclosure further provides a computer-readable medium. The computer-readable medium may be the computer-readable medium included in the apparatus in the above described embodiments, or a stand-alone computer-readable medium not assembled into the apparatus. The computer-readable medium stores one or more programs. The one or more programs, when executed by a device, cause the device to: acquire at least two browser cache files, the at least two browser cache files having identical terminal device attribute information and being from a terminal device having a target IP address; determine, based on an identifier set from the terminal device having the target IP address, a number of the terminal device having the target IP address, and the identifier set comprising at least one of: a device identifier set, an application identifier set, or a browser cache file identifier set; and determine and push a probability that the at least two browser cache files are from a same terminal device based on the number of the terminal device having the target IP address and a probability that one arbitrary terminal device has the terminal device attribute information.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for pushing information, the method comprising:
   acquiring at least two browser cache files, the at least two browser cache files having identical terminal device attribute information and being from terminal devices having a target Internet protocol (IP) address, wherein the at least two browser cache files are generated by the terminal devices having the target IP address, and the identical terminal device attribute information having identical device names, wherein each of the at least two browser cache files is acquired or generated by a browser during an interaction between the browser and a server via a network, the browser being an application capable of accessing and displaying a webpage and being installed on the terminal devices;
   determining, based on an identifier set from the terminal device having the target IP address, a number of the terminal devices having the target IP address, and the identifier set comprising at least one of: a device identifier set, an application identifier set, or a browser cache file identifier set; and
   determining and pushing a probability that the at least two browser cache files are generated by a same terminal device based on the number of the terminal devices having the target IP address and a predetermined probability that one arbitrary terminal device has the terminal device attribute information.

2. The method according to claim 1, wherein the method further comprises:
   marking the at least two browser cache files as being from the same terminal device and generating a corresponding tag, in response to the probability that the at least two browser cache files are from the same terminal device being greater than a preset threshold.

3. The method according to claim 1, wherein the identical terminal device attribute information comprises identical operating system information of the terminal device.

4. The method according to claim 1, wherein the probability that one arbitrary terminal device has the terminal device attribute information is predetermined by:
   determining, based on historically collected terminal device identifiers, a total number of collected terminal devices and a number of terminal devices having the terminal device attribute information in the collected terminal devices; and
   determining, based on the number of the terminal devices having the terminal device attribute information in the collected terminal devices and the total number of the collected terminal devices, the probability that one arbitrary terminal device has the terminal device attribute information.

5. The method according to claim 4, wherein the determining, based on an identifier set from the terminal device having the target IP address, a number of the terminal device having the target IP address, comprises:
   acquiring at least one of a device identifier, an application identifier, or a browser cache file identifier from the terminal device having the target IP address within a predetermined time range to determine the identifier set;
   classifying and de-duplicating identifiers in the identifier set; and
   determining the number of the terminal device having the target IP address based on the processed identifier set.

6. The method according to claim 5, wherein the determining and pushing a probability that the at least two browser cache files are generated by the same terminal device based on the number of the terminal devices having the target IP address and a probability that one arbitrary terminal device has the terminal device attribute information comprises:
   determining, based on the number of the terminal devices having the target IP address, a combination of different numbers of terminal devices having the target IP address and having the terminal device attribute information;

determining, based on the probability that one arbitrary terminal device has the terminal device attribute information, a probability of each of the numbers of the terminal devices having the terminal device attribute information; and determining and pushing the probability that the at least two browser cache files are generated by the same terminal device based on the probabilities of the numbers of the terminal devices having the terminal device attribute information.

7. An apparatus for pushing information, the apparatus comprising:

at least one processor; and a memory storing instructions, wherein the instructions when executed by the at least one processor, cause the at least one processor to perform operations, the operations comprising:

acquiring at least two browser cache files, the at least two browser cache files having identical terminal device attribute information and being from terminal devices having a target Internet protocol IP address, wherein the at least two browser cache files are generated by the terminal devices having the target IP address, and the identical terminal device attribute information having identical device names, wherein each of the at least two browser cache files is acquired or generated by a browser during an interaction between the browser and a server via a network, the browser being an application capable of accessing and displaying a webpage and being installed on the terminal devices;

determining, based on an identifier set from the terminal device having the target IP address, a number of terminal devices having the target IP address, and the identifier set comprising at least one of: a device identifier set, an application identifier set, or a browser cache file identifier set; and determining and pushing a probability that the at least two browser cache files are generated by a same terminal device based on the number of the terminal device having the target IP address and a probability that one arbitrary terminal device has the terminal device attribute information.

8. The apparatus according to claim 7, wherein the operations further comprise:

marking the at least two browser cache files as being from the same terminal device and generating a corresponding tag, in response to the probability that the at least two browser cache files are from the same terminal device being greater than a preset threshold.

9. A non-transitory computer medium, storing a computer program thereon, the computer program, when executed by a processor, causes the processor to perform operations, the operations comprising:

acquiring at least two browser cache files, the at least two browser cache files having identical terminal device attribute information and being from a terminal devices having a target Internet protocol (IP) address, wherein, the at least two browser cache files are generated by a browser of the terminal devices having the target IP address, and the identical terminal device attribute information having identical device names, wherein each of the at least two browser cache files is acquired or generated by a browser during an interaction between the browser and a server via a network, the browser being an application capable of accessing and displaying a webpage and being installed on the terminal devices;

determining, based on an identifier set from the terminal device having the target IP address, a number of the terminal devices having the target IP address, and the identifier set comprising at least one of: a device identifier set, an application identifier set, or a browser cache file identifier set; and determining and pushing a probability that the at least two browser cache files are generated by a same terminal device based on the number of the terminal device having the target IP address and a probability that one arbitrary terminal device has the terminal device attribute information.

10. The method according to claim 1, wherein a probability P of having the terminal device attribute information by an i-th terminal of the terminal devices is determined by a following formula: $P_i = C_{n-1}^{i-1} \times (P)^{i-1} \times (1-P_0)^{n-i}$, wherein $P_0$ is the probability that one arbitrary terminal device has the terminal device attribute information, $C_{n-1}^{i-1}$ is a number of combinations of (i−1) terminal devices in (n−1) terminal devices, n is the number of the terminal devices having the target IP address, i and n are natural numbers, and i<n.

11. The method according to claim 1, wherein each of the at least two browser cache files comprises a cookie.

12. The method according to claim 1, wherein each of the at least two browser cache files is generated by the web server based on at least one of: an IP address, a browser, or a login event when the web server was visited for the first time.

* * * * *

UNITED STATES PATENT AND TRADEMARK OFFICE
CERTIFICATE OF CORRECTION

PATENT NO. : 10,931,771 B2
APPLICATION NO. : 16/133470
DATED : February 23, 2021
INVENTOR(S) : Canxiang Zheng It is certified that error appears in the above-identified patent and that said Letters Patent is hereby corrected as shown below:

In the Claims

In Column 16, Line 35, Claim 10, delete "P" and insert -- $P_i$ --.

In Column 16, Line 37, Claim 10, delete "$(P)^{i-1}$" and insert -- $(P_0)^{i-1}$ --.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*